(12) United States Patent
Maekawa et al.

(10) Patent No.: US 10,850,563 B2
(45) Date of Patent: Dec. 1, 2020

(54) PNEUMATIC TIRE

(71) Applicant: Sumitomo Rubber Industries, Ltd., Kobe (JP)

(72) Inventors: Tetsuya Maekawa, Kobe (JP); Shinichiro Honda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 339 days.

(21) Appl. No.: 15/898,393

(22) Filed: Feb. 16, 2018

(65) Prior Publication Data

US 2018/0250985 A1 Sep. 6, 2018

(30) Foreign Application Priority Data

Mar. 6, 2017 (JP) ................. 2017-041748

(51) Int. Cl.
| | |
|---|---|
| *B60C 1/00* | (2006.01) |
| *C08L 9/06* | (2006.01) |
| *C08K 3/04* | (2006.01) |
| *C08K 3/36* | (2006.01) |
| *C08L 7/00* | (2006.01) |
| *C08L 21/00* | (2006.01) |

(52) U.S. Cl.
CPC ............ *B60C 1/0016* (2013.01); *B60C 1/00* (2013.01); *B60C 1/0008* (2013.01); *B60C 1/0025* (2013.01); *C08K 3/04* (2013.01); *C08K 3/36* (2013.01); *C08L 7/00* (2013.01); *C08L 9/06* (2013.01); *C08L 21/00* (2013.01)

(58) Field of Classification Search
CPC .................. C08L 7/00; B60C 1/0016
See application file for complete search history.

(56) References Cited

U.S. PATENT DOCUMENTS

| | | | | |
|---|---|---|---|---|
| 9,732,165 B2 * | 8/2017 | Sakaki | ................. | B60C 1/0016 |
| 9,856,362 B2 * | 1/2018 | Sakaki | ................. | B60C 1/0016 |
| 9,862,814 B2 * | 1/2018 | Sakaki | .................... | C08L 15/00 |
| 10,066,090 B2 * | 9/2018 | Sakaki | ..................... | C08K 3/04 |
| 10,131,763 B2 * | 11/2018 | Sakaki | ...................... | B60C 1/00 |
| 2015/0291765 A1 * | 10/2015 | Sasaki | ....................... | B60C 1/00 |
| | | | | 524/575.5 |
| 2016/0075863 A1 * | 3/2016 | Sakaki | ....................... | C08L 9/00 |
| | | | | 523/156 |
| 2016/0297897 A1 * | 10/2016 | Sakaki | .................. | B60C 1/0016 |
| 2016/0297947 A1 * | 10/2016 | Sakaki | .................. | B60C 1/0016 |
| 2016/0297954 A1 * | 10/2016 | Sakaki | ...................... | B60C 1/00 |
| 2018/0105654 A1 * | 4/2018 | Koyama | .................. | C08J 3/242 |
| 2019/0119473 A1 * | 4/2019 | Miyazaki | .................. | C08L 9/00 |
| 2019/0202237 A1 * | 7/2019 | Shiono | ...................... | C08K 7/02 |

FOREIGN PATENT DOCUMENTS

| | | | | |
|---|---|---|---|---|
| JP | 2014-12768 A | | 1/2014 | |
| WO | WO-2014188901 A1 * | 11/2014 | | .............. C08L 15/00 |
| WO | WO-2015098417 A1 * | 7/2015 | | ................ C08L 7/00 |

* cited by examiner

*Primary Examiner* — Liam J Heincer (74) *Attorney, Agent, or Firm* — Birch, Stewart, Kolasch & Birch, LLP (57) ABSTRACT

Provided is a pneumatic tire having excellent chipping resistance. The present invention relates to a pneumatic tire formed from a rubber composition, the rubber composition having an elongation at break of 540% or higher as measured under the following test conditions:

Tensile rate: 8.3 m/sec,
Temperature: 75° C.,
Specimen: No. 3 dumbbell.

8 Claims, 1 Drawing Sheet

PNEUMATIC TIRE

TECHNICAL FIELD

The present invention relates to a pneumatic tire.

BACKGROUND ART

Various techniques have been proposed for improving chipping resistance of pneumatic tires. For example, Patent Literature 1 discloses a technique that involves the incorporation of natural rubber, silica, and a cyclized rubber. Lately, however, it has been desired to further improve chipping resistance.

CITATION LIST

Patent Literature

Patent Literature 1: JP 2014-012768 A

SUMMARY OF INVENTION

Technical Problem

The present invention aims to solve the above problem and provide a pneumatic tire having excellent chipping resistance.

Solution to Problem

In general, chipping resistance is considered to correlate with the elongation at break (EB) measured in accordance with JIS K 6251:2010.

The JIS standard prescribes that the tensile rate used to measure elongation at break is 500±50 mm/min for No. 1, No. 2, No. 3, No. 5, and No. 6 dumbbell specimens and 200±20 mm/min for No. 7 and No. 8 dumbbell specimens. The present inventors conducted extensive research on the tensile rate and found that the elongation at break measured at 75° C. at a very high tensile rate of 8.3 m/sec (hereinafter, also referred to as high tensile rate EB) strongly correlates with the chipping resistance determined by on-vehicle evaluation. As a result of further research, the present inventors have found that good chipping resistance is ensured when the high tensile rate EB is within a predetermined range. Thus, they arrived at the present invention.

Specifically, the present invention relates to a pneumatic tire, formed from a rubber composition, the rubber composition having an elongation at break of 540% or higher as measured under the following test conditions:
Tensile rate: 8.3 m/sec,
Temperature: 75° C.,
Specimen: No. 3 dumbbell.

The rubber composition preferably contains a modified natural rubber which has been highly purified and which has been adjusted to a pH of 2 to 7.

The rubber composition preferably contains a styrene-butadiene rubber having a weight average molecular weight of 400,000 to 1,000,000.

The rubber composition preferably contains a silica having a nitrogen adsorption specific surface area of 90 to 220 m²/g.

The rubber composition preferably contains a carbon black having a nitrogen adsorption specific surface area of 110 to 190 m²/g.

Advantageous Effects of Invention

The pneumatic tire of the present invention is formed from a rubber composition having a high tensile rate EB within a predetermined range. Such a pneumatic tire provides excellent chipping resistance.

DESCRIPTION OF EMBODIMENTS

The pneumatic tire of the present invention is formed from a rubber composition that has an elongation at break (high tensile rate EB) of 540% or higher as measured under the following test conditions:
Tensile rate: 8.3 m/sec,
Temperature: 75° C.,
Specimen: No. 3 dumbbell.

Owing to the use of a rubber composition having a high tensile rate EB of 540% or higher as a tread or other tire components, the pneumatic tire provides excellent chipping resistance. To obtain better chipping resistance, the high tensile rate EB is preferably 600% or higher, more preferably 625% or higher, still more preferably 660% or higher, particularly preferably 700% or higher.

The upper limit of the high tensile rate EB is not particularly critical, but is preferably 800% or lower.

The elongation at break of a rubber composition greatly depends on the rubber component and fillers incorporated in the rubber composition. Thus, it is important to select the type and amount of these components so as to adjust the high tensile rate EB within a predetermined range.

The rubber component and fillers suitable to adjust the high tensile rate EB to 540% or higher are described below.

The rubber component includes, for example, diene rubbers such as natural rubber (NR), epoxidized natural rubber (ENR), polyisoprene rubber (IR), polybutadiene rubber (BR), styrene-butadiene rubber (SBR), acrylonitrile-butadiene rubber (NBR), chloroprene rubber (CR), butyl rubber (IIR), and styrene-isoprene-butadiene copolymer rubber (SIBR). Each of these rubbers may be used alone, or two or more of these may be used in combination. Among these, NR, SBR, and BR are preferred.

The natural rubber is preferably a modified natural rubber which has been highly purified and which has been adjusted to a pH of 2 to 7. The modified natural rubber which has been highly purified by removing non-rubber components such as proteins and phospholipids and whose pH is controlled to an appropriate pH has high affinity for silica and carbon black, and thus can significantly improve the high tensile rate EB.

The term "highly purified" means that impurities other than the natural polyisoprenoid component, such as phospholipids and proteins, are removed. The structure of natural rubber is such that the isoprenoid component is covered with the impurity components. By removing the impurity components, it is considered that the structure of the isoprenoid component is altered to change its interactions with compounding agents, thereby resulting in reduced energy loss and improved durability; therefore, it is possible to prepare a better quality rubber composition.

The modified natural rubber which has been highly purified and which has been adjusted to a pH of 2 to 7 may be any modified natural rubber which has been highly purified by reducing the amount of non-rubber components and whose pH is 2 to 7. Specific examples include: (1) a modified natural rubber having a pH of 2 to 7 obtained by removing non-rubber components in natural rubber, followed by treatment with an acidic compound; (2) a modified natural rubber having a pH of 2 to 7 obtained by washing a saponified natural rubber latex, followed by treatment with an acidic compound; and (3) a modified natural rubber having a pH of 2 to 7 obtained by washing a deproteinized natural rubber latex, followed by treatment with an acidic compound.

As described above, the modified natural rubber may be prepared, for example, by washing a saponified natural rubber latex or a deproteinized natural rubber latex with distilled water or the like, followed by treatment with an acidic compound. It is essential to shift the pH to the acidic side and lower the pH compared to that of distilled water used in the water washing, by the treatment with an acidic compound. Distilled water usually does not have a pH of 7.00 but has a pH of approximately 5 to 6. In this case, it is then essential to reduce the pH to a value more acidic than pH 5 to 6 by the treatment with an acidic compound. Specifically, the treatment with an acidic compound is preferably carried out to reduce the pH to a value lower by 0.2 to 2 than the pH of water used in the water washing.

The modified natural rubber has a pH of 2 to 7, preferably 3 to 6, more preferably 4 to 6.

The pH of the modified natural rubber is determined by cutting the rubber into pieces at most 2 mm square on each side, immersing the pieces in distilled water, irradiating the immersed pieces with microwaves for extraction at 90° C. for 15 minutes, and measuring the resulting immersion water with a pH meter. Specifically, the pH is determined as described later in EXAMPLES. Regarding the extraction, one-hour extraction using an ultrasonic washing device or the like cannot completely extract water-soluble components from the inside of the rubber and thus cannot reveal the pH of the inside accurately. In contrast, the above-described extraction technique can elucidate the real nature of the rubber.

The modified natural rubber has been highly purified by any of various methods, including the methods (1) to (3). For example, the modified natural rubber preferably has a phosphorus content of 200 ppm or less, more preferably 150 ppm or less.

The phosphorus content may be measured by conventional methods, such as ICP emission analysis. The phosphorus is presumably derived from the phospholipids in natural rubber.

In the case of the modified natural rubber containing an artificial antioxidant, the modified natural rubber preferably has a nitrogen content of 0.15% by mass or less, more preferably 0.1% by mass or less, after it is immersed in acetone at room temperature (25° C.) for 48 hours. Highly purified natural rubber may degrade during long-term storage because it is free of natural antioxidant components that natural rubber is thought to contain by nature. To address this problem, artificial antioxidants are added in some cases. The nitrogen content is measured after the artificial antioxidants in the rubber are removed by extraction with acetone. The nitrogen content may be measured by conventional methods, such as the Kjeldahl method or the use of a trace nitrogen analyzer. The nitrogen is derived from proteins and amino acids.

The modified natural rubber preferably has a Mooney viscosity ML (1+4) at 130° C. of 75 or less, more preferably 40 to 75, still more preferably 45 to 75, particularly preferably 50 to 70, most preferably 55 to 65, as measured in accordance with JIS K 6300:2001-1. The modified natural rubber having a Mooney viscosity of 75 or less does not need mastication which is usually necessary before kneading of rubbers. Such a modified natural rubber prepared without a mastication process can be suitably used as a compounding material for preparing the rubber composition. In contrast, the modified natural rubber having a Mooney viscosity of more than 75 tends to need mastication before use, which can cause disadvantages such as the need of dedicated equipment, and a loss of electricity or thermal energy.

The modified natural rubber preferably has a heat aging resistance index of 75 to 120%, wherein the heat aging resistance index is defined by the equation below based on Mooney viscosities ML (1+4) at 130° C. determined as above. Heat aging resistance index (%)=(Mooney viscosity of the modified natural rubber measured after heat treatment at 80° C. for 18 hours)/(Mooney viscosity of the modified natural rubber before the heat treatment)×100

The heat aging resistance index defined by the equation is more preferably 80 to 115%, still more preferably 85 to 110%. Although various methods for evaluating heat aging resistance of rubbers are reported, the heat aging resistance, such as during the production or service of tires, can be accurately evaluated by determining the rate of change in Mooney viscosity ML (1+4) at 130° C. before and after heat treatment at 80° C. for 18 hours. With the index falling within the range indicated above, excellent heat aging resistance is obtained, and the high tensile rate EB is significantly improved.

The modified natural rubber which has been highly purified and which has been adjusted to a pH of 2 to 7, such as the rubbers (1) to (3), may be prepared by, for example, the following production method 1 or 2. The production method 1 includes Step 1-1 of saponifying natural rubber latex, Step 1-2 of washing the saponified natural rubber latex, and Step 1-3 of treating the latex with an acidic compound. The production method 2 includes Step 2-1 of deproteinizing natural rubber latex, Step 2-2 of washing the deproteinized natural rubber latex, and Step 2-3 of treating the latex with an acidic compound.

<Production Method 1>
(Step 1-1)

Step 1-1 includes saponifying natural rubber latex. This treatment decomposes the phospholipids and proteins in the rubber, thereby providing a saponified natural rubber latex containing a reduced amount of non-rubber components.

Natural rubber latex is collected as sap of natural rubber trees such as hevea trees. It contains components including water, proteins, lipids, and inorganic salts as well as a rubber component. The gel fraction in the rubber is considered to be derived from a complex of various impurities therein. In the present invention, the natural rubber latex to be used may be a raw latex (field latex) taken from hevea trees by tapping, or a concentrated latex prepared by concentration via centrifugation or creaming (e.g., purified latex, high-ammonia latex prepared by adding ammonia in a conventional manner, or LATZ latex which has been stabilized with zinc oxide, TMTD, and ammonia).

The saponification process may be suitably performed by, for example, the methods described in JP 2010-138359 A and JP 2010-174169 A, both of which are incorporated herein by reference. Specifically, the saponification method may be as follows, for example.

The saponification method may include adding an alkali and optionally a surfactant to natural rubber latex and leaving the mixture for a certain period of time at a predetermined temperature. It may optionally include stirring or the like.

The alkali used in the saponification is preferably, but not limited to, sodium hydroxide, potassium hydroxide, or the like. Non-limiting examples of the surfactant include known anionic surfactants, nonionic surfactants, and amphoteric surfactants, such as polyoxyethylene alkyl ether sulfates. Suitable are anionic surfactants such as polyoxyethylene alkyl ether sulfates because they permit suitable saponification without solidifying the rubber. In the saponification, the amounts of the alkali and the surfactant, and the temperature and duration of the saponification may be appropriately selected.

(Step 1-2)

Step 1-2 includes washing the saponified natural rubber latex obtained in Step 1-1. The non-rubber components such as proteins are removed by the washing process.

For example, Step 1-2 may be carried out by coagulating the saponified natural rubber latex obtained in Step 1-1 to produce a coagulated rubber, treating the coagulated rubber with a basic compound, and then washing the resulting rubber. Specifically, after a coagulated rubber is produced, it is diluted with water to transfer the water-soluble components to the aqueous phase, and then the water is removed, whereby the non-rubber components can be removed. Further, the coagulated rubber is treated with a basic compound so that the non-rubber components which have been trapped inside the rubber during the coagulation can be redissolved. Thus, the non-rubber components such as proteins firmly attached inside the coagulated rubber can be removed.

An exemplary coagulation method may include adding an acid, such as formic acid, acetic acid, or sulfuric acid, to adjust the pH, and then optionally adding a polymer flocculant. This does not produce large coagula, but produces a particulate rubber having a diameter in the order of between not more than one to a few millimeters and 20 mm, and then the proteins and the like in such a rubber are sufficiently removed by the treatment with a basic compound. The pH is preferably adjusted within the range of 3.0 to 5.0, more preferably 3.5 to 4.5.

Examples of the polymer flocculant include cationic polymer flocculants such as poly (dimethylaminoethyl (meth) acrylate methyl chloride quaternary salt); anionic polymer flocculants such as poly (acrylates); nonionic polymer flocculants such as polyacrylamide; and amphoteric polymer flocculants such as a copolymer of a dimethylaminoethyl (meth)acrylate methyl chloride quaternary salt and an acrylate. The amount of the polymer flocculant added may be appropriately selected.

Next, the coagulated rubber thus obtained is treated with a basic compound. The basic compound is not particularly limited, but may suitably be a basic inorganic compound because of its ability to remove proteins and the like.

Examples of the basic inorganic compound include metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia.

Examples of alkali metal hydroxides include lithium hydroxide, sodium hydroxide, and potassium hydroxide. Examples of alkaline earth metal hydroxides include magnesium hydroxide, calcium hydroxide, and barium hydroxide. Examples of alkali metal carbonates include lithium carbonate, sodium carbonate, and potassium carbonate. Examples of alkaline earth metal carbonates include magnesium carbonate, calcium carbonate, and barium carbonate. Examples of alkali metal hydrogen carbonates include lithium hydrogen carbonate, sodium hydrogen carbonate, and potassium hydrogen carbonate. Examples of alkali metal phosphates include sodium phosphate and sodium hydrogen phosphate. Examples of alkali metal acetates include sodium acetate and potassium acetate. Examples of alkali metal hydrides include sodium hydride and potassium hydride.

Among these, metal hydroxides, metal carbonates, metal hydrogen carbonates, metal phosphates, and ammonia are preferred, with alkali metal carbonates, alkali metal hydrogen carbonates, and ammonia being more preferred, with sodium carbonate or sodium hydrogen carbonate being still more preferred. The basic compounds may be used alone, or two or more of them may be used in combination.

The coagulated rubber may be treated with the basic compound by any method that brings the coagulated rubber into contact with the basic compound. Examples include a method of immersing the coagulated rubber in an aqueous solution of the basic compound, and a method of spraying an aqueous solution of the basic compound onto the coagulated rubber. The aqueous solution of the basic compound may be prepared by diluting and dissolving the basic compound in water.

The amount of the basic compound based on 100% by mass of the aqueous solution is preferably 0.1% by mass or more, more preferably 0.3% by mass or more. An amount of less than 0.1% by mass may not sufficiently remove proteins. The amount of the basic compound is preferably 10% by mass or less, more preferably 5% by mass or less. An amount of more than 10% by mass tends not to increase the amount of decomposed proteins, in spite of such a large amount of the basic compound taken, and thus tends to lead to poor efficiency.

The aqueous solution of the basic compound preferably has a pH of 9 to 13. In view of treatment efficiency, the pH is more preferably 10 to 12.

The treatment temperature may be appropriately selected, and it is preferably 10° C. to 50° C., more preferably 15° C. to 35° C. Moreover, the treatment duration is usually one minute or longer, preferably 10 minutes or longer, more preferably 30 minutes or longer. When the duration is shorter than one minute, the effects of the present invention may not be well achieved. Although the upper limit is not critical, the duration is preferably 48 hours or shorter, more preferably 24 hours or shorter, still more preferably 16 hours or shorter, in view of productivity.

Washing is performed after the treatment with a basic compound. With this treatment, it is possible to sufficiently remove the non-rubber components such as proteins which have been trapped inside the rubber during the coagulation, and further to sufficiently remove the basic compounds not only on the surface but also inside the coagulated rubber. In particular, by removing the basic compounds remaining in the entire rubber in the washing step, it is possible to allow the entire rubber to sufficiently undergo treatment with an acidic compound as described later. Thus, the pH not only on the surface but also inside the rubber can be adjusted to 2 to 7.

The washing process can be suitably carried out by methods that can sufficiently remove the non-rubber components and the basic compound contained in the entire rubber. For example, it may be carried out by a method in which the rubber component is diluted and washed in water, followed by centrifugation or by leaving the rubber to float and then draining only the aqueous phase to collect the rubber component. The number of washing cycles may be arbitrarily chosen as long as the amounts of non-rubber components such as proteins and of the basic compound can be reduced to desired levels. In the case of repeating a washing cycle which consists of adding 1,000 mL of water per 300 g of dry rubber, stirring the mixture, and then removing water, the number of washing cycles is preferably 3 (3 cycles) or more, more preferably 5 (5 cycles) or more, still more preferably 7 (7 cycles) or more.

The washing process is preferably performed until the rubber has a phosphorus content of 200 ppm or less and/or a nitrogen content of 0.15% by mass or less. By sufficiently removing phospholipids and proteins in the washing process, the high tensile rate EB is significantly improved.

(Step 1-3)

Step 1-3 includes treating the washed rubber obtained in Step 1-2 with an acidic compound. This treatment adjusts the pH of the entire rubber to 2 to 7 as described above, thereby providing a modified natural rubber that offers good high tensile rate EB.

Although heat aging resistance tends to be reduced due to the treatment with a basic compound or the like, an additional treatment with an acidic compound prevents such a problem and provides good heat aging resistance.

Non-limiting examples of the acidic compound include inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, α-resorcylic acid, β-resorcylic acid, γ-resorcylic acid, gallic acid, phloroglycine, sulfosalicylic acid, ascorbic acid, erythorbic acid, and bisphenolic acids. Preferred among these are acetic acid, sulfuric acid, formic acid, and the like. The acidic compounds may be used alone, or two or more of them may be used in combination.

The coagulated rubber may be treated with the acid by any method that brings the coagulated rubber into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound may be prepared by diluting and dissolving the acidic compound in water.

Although the amount of the acidic compound based on 100% by mass of the aqueous solution is not particularly limited, the lower limit is preferably 0.1% by mass or more, more preferably 0.3% by mass or more, while the upper limit is preferably 15% by mass or less, more preferably 10% by mass or less, still more preferably 5% by mass or less. An amount within the range indicated above leads to good heat aging resistance.

The treatment temperature may be appropriately selected, and it is preferably 10° C. to 50° C., more preferably 15° C. to 35° C. Usually, the treatment duration is preferably 3 seconds or longer, more preferably 10 seconds or longer, still more preferably 30 seconds or longer. When the duration is shorter than three seconds, the rubber may not be sufficiently neutralized and therefore the effects of the present invention may not be well achieved. Although the upper limit is not critical, the duration is preferably 24 hours or shorter, more preferably 10 hours or shorter, still more preferably five hours or shorter, in view of productivity.

In the treatment such as immersion in the aqueous solution of the acidic compound, the pH is preferably adjusted to 6 or lower. Such neutralization leads to excellent heat aging resistance. The upper limit of the pH is more preferably 5 or lower, still more preferably 4.5 or lower. The lower limit of the pH is not particularly critical, and it is preferably 1 or higher, more preferably 2 or higher, because too strong acidity may cause degradation of the rubber and may complicate the wastewater disposal, though depending on the duration of immersion.

The immersing treatment may be carried out, for example, by leaving the coagulated rubber in an aqueous solution of the acidic compound.

After the above treatment, the acidic compound used in the treatment with an acidic compound is removed, and then the treated coagulated rubber may appropriately be washed. The washing process may be carried out in the same manner as described above. For example, the amount of non-rubber components may be further reduced and adjusted to a desired level by repeating washing. Moreover, the coagulated rubber obtained after the treatment with an acidic compound may be squeezed with, for example, a roll squeezer into a sheet shape or the like. The additional step of squeezing the coagulated rubber allows the surface and inside of the coagulated rubber to have a uniform pH, thereby providing a rubber having desired properties. After the washing and/or squeezing steps are performed as needed, the resulting rubber is milled on a creper and dried, whereby the modified natural rubber can be obtained.

The drying process may be carried out in any manner, such as by using a common drier for drying TSR, e.g. a trolley dryer, a vacuum dryer, an air dryer, or a drum dryer.

<Production Method 2>

(Step 2-1)

Step 2-1 includes deproteinizing natural rubber latex. This treatment produces a deproteinized natural rubber latex that is free of non-rubber components such as proteins. The natural rubber latex used in Step 2-1 may be the same as described above.

The deproteinization process may be carried out by any known method by which proteins can be removed. An exemplary method may include adding a proteolytic enzyme to natural rubber latex to decompose proteins.

The proteolytic enzyme to be used in the deproteinization process is not particularly limited, and may be any of those derived from bacteria, molds, and yeasts. Specifically, it may be one or a combination of proteases, peptidases, cellulases, pectinases, lipases, esterases, amylases, and other enzymes.

The amount of the proteolytic enzyme added is preferably 0.005 parts by mass or more, more preferably 0.01 parts by mass or more, still more preferably 0.05 parts by mass or more, per 100 parts by mass of the solids in the natural rubber latex. When the amount is less than the lower limit, the proteolytic reaction may be insufficient.

A surfactant may also be added together with the proteolytic enzyme in the deproteinization process. Examples of the surfactant include anionic surfactants, cationic surfactants, nonionic surfactants, and amphoteric surfactants.
(Step 2-2)

Step 2-2 includes washing the deproteinized natural rubber latex obtained in Step 2-1. The non-rubber components such as proteins are removed by the washing process.

Step 2-2 may be carried out, for example, by coagulating the deproteinized natural rubber latex obtained in Step 2-1 to produce a coagulated rubber, and then washing the coagulated rubber. Thus, the non-rubber components such as proteins firmly attached inside the coagulated rubber can be removed.

The coagulation process may be carried out in the same manner as in Step 1-2. Further, treatment with a basic compound as described above may optionally be performed. The coagulated rubber thus produced is then washed. This washing process may be carried out in the same manner as in Step 1-2, whereby the non-rubber components such as proteins and the basic compound can be removed.

For the same reason as described above, the washing process is preferably performed until the rubber has a phosphorus content of 200 ppm or less and/or a nitrogen content of 0.15% by mass or less.
(Step 2-3)

Step 2-3 includes treating the washed rubber obtained in Step 2-2 with an acidic compound. Acid coagulation using a small amount of acid as well as the treatment with a basic compound tend to lead to reduced heat aging resistance as a water extract of the finally obtained rubber shows alkalinity or neutrality. Proteolytic enzymes having an optimum pH in an alkaline range are generally used because they provide suitable deproteinization. Such an enzymatic reaction is often performed under alkaline conditions in view of the optimum pH. To adjust the pH of the final rubber to 2 to 7, natural rubber latex is preferably deproteinized at a pH of 8 to 11, more preferably a pH of 8.5 to 11 in Step 2-1. The deproteinized latex is then solidified under acidic conditions in the coagulation process. It has been found that when the solidified rubber is washed only with water, the resulting rubber, when extracted as described later, shows a higher pH value than that of the extracting solvent, which results in a great reduction particularly in heat aging resistance. In contrast, when the solidified rubber is treated with an acidic compound after the optional treatment with a basic compound, the above problem is prevented and good heat aging resistance is provided. Moreover, good high tensile rate EB is also obtained.

The same acidic compounds as mentioned in Step 1-3 can be used. Moreover, the coagulated rubber may be treated with the acid by any method that brings the coagulated rubber into contact with the acidic compound. Examples include a method of immersing the coagulated rubber in an aqueous solution of the acidic compound, and a method of spraying an aqueous solution of the acidic compound onto the coagulated rubber. The aqueous solution of the acidic compound may be prepared by diluting and dissolving the acidic compound in water.

Although the amount of the acidic compound based on 100% by mass of the aqueous solution is not particularly limited, the lower limit is preferably 0.01% by mass or more, more preferably 0.03% by mass or more, while the upper limit is preferably 15% by mass or less, more preferably 10% by mass or less, still more preferably 5% by mass or less. An amount within the range indicated above leads to good heat aging resistance and good high tensile rate EB.

The temperature and duration for the treatment may be appropriately selected. The treatment may be carried out at the same temperature as in Step 1-3. Moreover, in the treatment such as immersion in the aqueous solution of the acidic compound, the pH is preferably adjusted to the same range as in Step 1-3.

After the above treatment, the acidic compound used in the treatment with an acidic compound is removed, and then the treated coagulated rubber may appropriately be washed. This washing process may be carried out in the same manner as described above. For example, the amount of non-rubber components may be further reduced and adjusted to a desired level by repeating washing. After completion of the washing, the resulting rubber is dried, whereby the modified natural rubber can be obtained. The drying process may be carried out in any manner, for example, by the above-described techniques.

The amount of the modified natural rubber based on 100% by mass of the rubber component is preferably 30% by mass or more, more preferably 40% by mass or more, still more preferably 50% by mass or more, but is preferably 90% by mass or less, more preferably 85% by mass or less.

Any SBR may be used including those commonly used in the tire industry, such as solution-polymerized SBR (S-SBR) and emulsion-polymerized SBR (E-SBR).

The SBR preferably has a weight average molecular weight of 400,000 or more, more preferably 800,000 or more, but preferably 1,000,000 or less, more preferably 900,000 or less.

Herein, the weight average molecular weight (Mw) may be determined by gel permeation chromatography (GPC) (GPC-8000 series available from Tosoh Corporation, detector: differential refractometer, column: TSKGEL SUPER-MULTIPORE HZ-M available from Tosoh Corporation) calibrated with polystyrene standards.

The amount of SBR based on 100% by mass of the rubber component is preferably 5% by mass or more, more preferably 10% by mass or more, still more preferably 15% by mass or more, but is preferably 50% by mass or less, more preferably 40% by mass or less.

The amount of BR based on 100% by mass of the rubber component is preferably 5% by mass or more, more preferably 10% by mass or more, still more preferably 15% by mass or more, but is preferably 50% by mass or less, more preferably 40% by mass or less.

The filler used is preferably carbon black or silica.

The carbon black preferably has a nitrogen adsorption specific surface area ($N_2SA$) of 110 $m^2/g$ or more, more preferably 140 $m^2/g$ or more, but preferably 190 $m^2/g$ or less, more preferably 180 $m^2/g$ or less. A carbon black having an $N_2SA$ within the above range is excellent in reinforcement and can significantly improve the high tensile rate EB. Moreover, since such a carbon black, even in a small amount, provides excellent reinforcement, even a reduced amount can maintain a good level of chipping resistance. Thus, fuel economy can be improved while maintaining good chipping resistance.

Herein, the $N_2SA$ of the carbon black is determined in accordance with ASTM D4820-93.

The amount of carbon black per 100 parts by mass of the rubber component is preferably 30 parts by mass or more, more preferably 45 parts by mass or more, but is preferably 70 parts by mass or less, more preferably 60 parts by mass or less.

The silica preferably has a nitrogen adsorption specific surface area ($N_2SA$) of 90 $m^2/g$ or more, more preferably 150 $m^2/g$ or more, but preferably 220 $m^2/g$ or less, more preferably 200 $m^2/g$ or less. A silica having an $N_2SA$ within the above range is excellent in reinforcement and can significantly improve the high tensile rate EB. Moreover, since such a silica, even in a small amount, provides excellent reinforcement, even a reduced amount can maintain a good level of chipping resistance. Thus, fuel economy can be improved while maintaining good chipping resistance.

The $N_2SA$ of the silica is determined in accordance with ASTM D1993-03.

The amount of silica per 100 parts by mass of the rubber component is preferably 20 parts by mass or more, more preferably 30 parts by mass or more, but is preferably 60 parts by mass or less, more preferably 50 parts by mass or less.

The rubber composition according to the present invention may appropriately contain, in addition to the components described above, other compounding agents commonly used in the tire industry, such as silane coupling agents, waxes, zinc oxide, stearic acid, releasing agents, antioxidants, vulcanization accelerators, sulfur, and other materials.

The pneumatic tire of the present invention may be produced using the rubber composition by conventional methods.

Specifically, the unvulcanized rubber composition containing the components may be extruded into the shape of a tire component such as a tread, and assembled with other tire components in a usual manner on a tire building machine to build an unvulcanized tire, which is then heated and pressurized in a vulcanizer, whereby the tire can be produced.

EXAMPLES

The present invention will be specifically described with reference to, but not limited to, examples below.

The chemicals used in the examples and comparative examples are listed below.

Modified natural rubbers (highly purified natural rubbers) A to D: see Production Examples 1 to 4 described below
NR: TSR 20
SBR 1: see Production Example 5 described below (Mw: 580,000)
SBR 2: see Production Example 6 described below (Mw: 500,000)
SBR 3: T3830 available from Asahi Kasei Corporation (Mw: 1,000,000)
BR: BR360B available from Ube Industries, Ltd. Carbon black 1: N220 ($N_2SA$: 114 $m^2/g$) available from Cabot Japan K.K.
Carbon black 2: carbon black ($N_2SA$: 181 $m^2/g$) available from Mitsubishi Chemical Corporation
Silica 1: VN3 ($N_2SA$: 167 $m^2/g$) available from Evonik
Silica 2: 9100Gr ($N_2SA$: 212 $m^2/g$) available from Evonik
Silane coupling agent: Si69 (bis(3-triethoxysilyl-propyl) tetrasulfide) available from Degussa
Zinc oxide: zinc oxide #2 available from Mitsui Mining and Smelting Co., Ltd.
Stearic acid: stearic acid beads "Tsubaki" available from NOF Corporation
Antioxidant: Nocrac 6C (N-phenyl-N'-(1,3-dimethyl-butyl)-p-phenylenediamine, 6PPD) available from Ouchi Shinko Chemical Industrial Co., Ltd.
Sulfur: powdered sulfur available from Tsurumi Chemical Industry Co., Ltd.
Vulcanization accelerator 1: Nocceler NS available from Ouchi Shinko Chemical Industrial Co., Ltd.
Vulcanization accelerator 2: Soxinol D available from Sumitomo Chemical Co., Ltd.

The chemicals used in Production Examples 1 to 4 are listed below.
Field latex: field latex available from Muhibbah Lateks
EMAL E-27C (surfactant): EMAL E-27C (sodium polyoxyethylene lauryl ether sulfate, active ingredient content: 27% by mass) available from Kao Corporation
NaOH: NaOH available from Wako Pure Chemical Industries, Ltd.
Wingstay L (antioxidant): Wingstay L (butylated condensate of ρ-cresol and dicyclopentadiene) available from Eliokem
Emulvin W (surfactant): Emulvin W (aromatic polyglycol ether) available from Lanxess
Tamol NN 9104 (surfactant): Tamol NN 9104 (sodium salt of naphthalenesulfonic acid/formaldehyde) available from BASF
Van gel B (surfactant): Van gel B (hydrated magnesium aluminum silicate) available from Vanderbilt <Production of Modified Natural Rubber>

Production Example 1

An amount of 462.5 g of water was mixed with 12.5 g of Emulvin W, 12.5 g of Tamol NN 9104, 12.5 g of Van gel B, and 500 g of Wingstay L (total amount of mixture: 1,000 g) for 16 hours using a ball mill to prepare an antioxidant dispersion.

The solids concentration (DRC) of the field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at room temperature to obtain a saponified natural rubber latex. Next, 6 g of the antioxidant dispersion was added to the latex, and the mixture was stirred for 2 hours, and then water was further added to dilute the mixture until the rubber concentration reached 15% (w/v). Thereafter, formic acid was added with slow stirring to adjust the pH to 4.0. Subsequently, a cationic polymer flocculant was added and the mixture was stirred for two minutes, so that coagulation occurred. The thus obtained coagulum (coagulated rubber) had a diameter of approximately 0.5 to 5 mm. The coagulum was taken out and immersed in 1,000 mL of a 2% by mass aqueous solution of sodium carbonate for four hours at room temperature, and then the rubber was taken out. The rubber was combined with 2,000 mL of water, and the mixture was stirred for two minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, followed by stirring for two minutes. This cycle of operation was repeated three times. Then, the water was squeezed from the resulting rubber with a water squeezing roll to form the rubber into a sheet, followed by drying for four hours at 90° C. In this manner, a solid rubber (highly purified natural rubber A) was prepared.

Production Example 2

A solid rubber (highly purified natural rubber B) was prepared as in Production Example 1, except that 2% by mass formic acid was added until the pH reached 1.

Production Example 3

A commercially available high ammonia latex (Muhibbah Lateks in Malaysia, solid rubber content: 62.0%) was diluted with a 0.12% aqueous solution of naphthenic acid sodium salt to adjust the solid rubber content to 10%. Then, sodium dihydrogen phosphate was added to adjust the pH to 9.2. Thereto was added a proteolytic enzyme (2.0 M alcalase) in an amount of 0.87 g per 10 g of the rubber content. Then, the pH was again adjusted to 9.2, and the resulting mixture was maintained at 37° C. for 24 hours.

Next, to the latex obtained after completion of the enzymatic treatment was added a 1% aqueous solution of a nonionic surfactant (trade name EMULGEN 810, Kao Corporation) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This cycle of operation was repeated twice. The resulting cream fraction was dispersed in distilled water to prepare a deproteinized rubber latex having a solid rubber content of 60%.

To the latex was added 2% by mass formic acid until the pH reached 4. Then, a cationic polymer flocculant was added, so that 0.5-5 mm rubber particles were formed. They were dehydrated as much as possible, and water was added in an amount of 50 g per 10 g of the rubber content, followed by adding 2% by mass formic acid until the pH reached 3. Thirty minutes later, the rubber was taken out and formed into a sheet using a creper, followed by drying for four hours at 90° C. In this manner, a solid rubber (highly purified natural rubber C) was prepared.

Production Example 4

A solid rubber (highly purified natural rubber D) was prepared as in Production Example 3, except that 2% by mass formic acid was added until the pH reached 1.

The solid rubbers prepared as above were evaluated as described below. Table 1 shows the results together with the evaluation results of TSR 20.

<Measurement of pH of Rubber>

The prepared rubber in an amount of 5 g was cut into pieces so that the sum of the three dimensions of each piece was 5 mm or less (about 1-2 mm×about 1-2 mm×about 1-2 mm). The pieces were placed in a 100 mL beaker and combined with 50 mL of distilled water at room temperature. The contents were heated to 90° C. over two minutes, followed by irradiation with microwaves (300 W) for 13 minutes (total 15 minutes) while adjusting and maintaining the temperature at 90° C. Then, after the resulting immersion water was cooled to 25° C. using an ice bath, the pH of the immersion water was measured with a pH meter.

<Measurement of Nitrogen Content>
(Acetone Extraction (Preparation of Specimen))

Each solid rubber was finely cut into sample pieces 1 mm square, and about 0.5 g of the sample was weighed. The sample was immersed in 50 g of acetone at room temperature (25° C.) for 48 hours. Then, the rubber was taken out and dried. Thus, specimens (from which antioxidants had been extracted) were prepared.

(Measurement)

The nitrogen content of the specimens was measured as follows.

The acetone-extracted specimens prepared as above were decomposed and gasified using a trace nitrogen/carbon analyzer "SUMIGRAPH NC 95A" (Sumika Chemical Analysis Service, Ltd.), and the gas generated was analyzed using a gas chromatograph "GC-8A" (Shimadzu Corporation) to determine the nitrogen content.

<Measurement of Phosphorus Content>

The phosphorus content was determined using an ICP emission spectrometer (P-4010, Hitachi, Ltd.).

<Measurement of Gel Content>

The raw rubber was cut into 1 mm×1 mm sample pieces, and about 70 mg of the sample was accurately weighed. Thereto was added 35 mL of toluene, and the mixture was left in a cool, dark place for one week. Subsequently, the mixture was centrifuged so that a gel fraction that was insoluble in toluene was precipitated, and a toluene-soluble supernatant was removed. Only the gel fraction was solidified with methanol and then dried. The mass of the dried gel fraction was measured and used to determine the gel content (% by mass) by the following equation:

Gel content (% by mass)=(mass (mg) after drying)/(initial mass (mg) of sample)×100.

<Heat Aging Resistance>

The solid rubbers were measured for Mooney viscosity ML (1+4) at 130° C. in accordance with JIS K 6300:2001-1 before and after being held at 80° C. for 18 hours. The measured values were used to calculate the heat aging resistance index by the above-described equation.

TABLE 1

| | Saponified natural rubber | | Deproteinized natural rubber | | |
| --- | --- | --- | --- | --- | --- |
| | Highly purified natural rubber A Production Example 1 | Highly purified natural rubber B Production Example 2 | Highly purified natural rubber C Production Example 3 | Highly purified natural rubber D Production Example 4 | Natural rubber TSR20 |
| pH | 5 | 3.8 | 4.9 | 3.6 | — |
| Nitrogen content (% by mass) | 0.07 | 0.07 | 0.02 | 0.02 | 0.36 |
| Phosphorus content (ppm) | 92 | 88 | 108 | 99 | 590 |
| Gel content (% by mass) | 6 | 7 | 9 | 10 | 29.8 |
| Mooney viscosity | 58 | 56 | 58 | 57 | 88 |
| Heat aging resistance (%) | 95 | 99 | 85 | 88 | 103 |

<Production of SBR>

Production Example 5

A nitrogen-purged autoclave reactor was charged with hexane, 1,3-butadiene, styrene, tetrahydrofuran, and ethylene glycol diethyl ether. Next, a solution of n-butyllithium in n-hexane was added to start polymerization. The copolymerization of 1,3-butadiene and styrene was performed at a stirring rate of 130 rpm and a temperature inside the reactor of 65° C. for three hours while the monomers were continuously fed into the reactor. After completion of the polymerization, 2,6-di-tert-butyl-p-cresol was added to the reaction mixture, followed by removal of the solvent by steam stripping and drying with a hot roll adjusted at 110° C. Thus, SBR 1 was prepared.

Production Example 6

SBR 2 was prepared as in Production Example 5, except that the amounts of the chemicals were changed.

Examples and Comparative Examples

According to each of the formulations indicated in Table 2, the components were kneaded to obtain an unvulcanized rubber composition.

The unvulcanized rubber composition was press-vulcanized at 160° C. for 20 minutes to obtain a vulcanized rubber composition.

Separately, the unvulcanized rubber composition was extruded into a tread shape, assembled with other tire components on a tire building machine, and vulcanized at 160° C. for 20 minutes to prepare a test tire.

The vulcanized rubber compositions and test tires prepared as above were evaluated as described below. Table 2 shows the results.

<Heat Build-Up Properties>
(Viscoelastic Testing)

The loss tangent (tan δ) of the vulcanized rubber compositions was measured using a viscoelastic spectrometer VES (Iwamoto Seisakusho Co., Ltd.) at a temperature of 30° C., a frequency of 10 Hz, an initial strain of 10%, and a dynamic strain of 2%. The results are expressed as an index, with Formulation 10 (comparative example) set equal to 100. A higher index indicates less heat build-up and better fuel economy.

<Chipping Resistance>
(High Tensile Rate EB)

No. 3 dumbbell specimens of the vulcanized rubber compositions were subjected to a tensile test at a temperature of 75° C. and a tensile rate of 8.3 m/sec according to JIS K 6251:2010 to determine the high tensile rate EB (%).

(Low Tensile Rate EB)

No. 3 dumbbell specimens of the vulcanized rubber compositions were subjected to a tensile test at a temperature of 75° C. and a tensile rate of 500 ram/min ($8.3 \times 10^{-3}$ m/sec) according to JIS K 6251:2010 to determine the low tensile rate EB (%).

(On-Vehicle Evaluation)

Each set of the test tires was mounted on a front-engine, front-wheel-drive car made in Japan. After the car ran 8,000 km, the number of chipped areas on the tire tread portion was counted. The results are expressed as an index, with Formulation 10 (comparative example) set equal to 100. A higher index indicates fewer chipped areas and better chipping resistance.

<Correlation>

Figure 1:
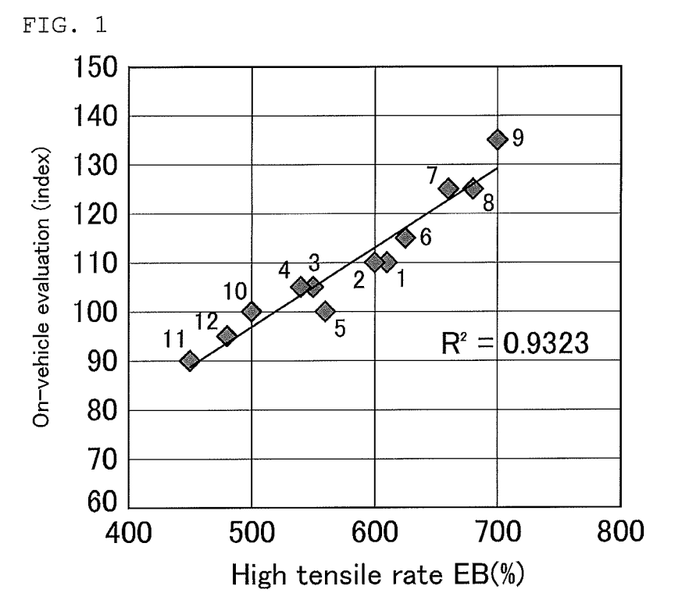
FIG. 1 shows a scatter plot of the variables: the elongation at break measured at a tensile rate of 8.3 m/sec and the chipping resistance index determined by on-vehicle evaluation.
Figure 2:
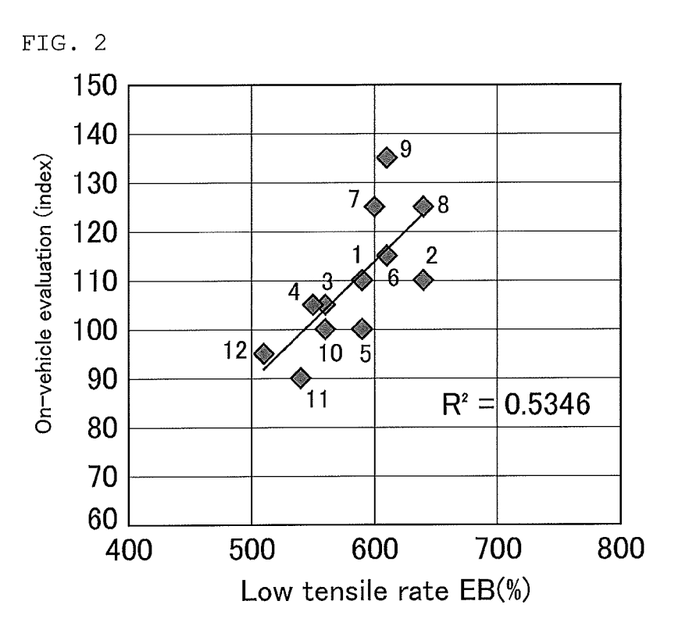
FIG. 2 shows a scatter plot of the variables: the elongation at break measured at a tensile rate of 500 mm/min ($8.3 \times 10^{-3}$ m/sec) and the chipping resistance index determined by on-vehicle evaluation.

Scatter plots between the on-vehicle evaluation index and high tensile rate EB or low tensile rate EB (variables) measured as above were prepared. Then, fit curves were added to the scatter plots. The correlations between these variables were evaluated based on the obtained coefficients of determination ($R_2$) (FIGS. 1 and 2). An $R_2$ value within the range of 0.7 to 1.0 indicates a high correlation between the two variables.

TABLE 2

| | | | Example Formulation number | | | | | |
|---|---|---|---|---|---|---|---|---|
| | | | 1 | 2 | 3 | 4 | 5 | 6 |
| Formulation (parts by mass) | | Highly purified natural rubber A | 60 | — | — | — | 60 | 60 |
| | | Highly purified natural rubber B | — | 60 | — | — | — | — |
| | | Highly purified natural rubber C | — | — | 60 | — | — | — |
| | | Highly purified natural rubber D | — | — | — | 60 | — | — |
| | NR | | — | — | — | — | — | — |
| | SBR 1 | general-purpose | 20 | 20 | 20 | 20 | — | — |
| | SBR 2 | general-purpose | — | — | — | — | 20 | — |
| | SBR 3 | high molecular weight | — | — | — | — | — | 20 |
| | BR | | 20 | 20 | 20 | 20 | 20 | 20 |
| | Carbon black 1 | general-purpose | 50 | 50 | 50 | 50 | 50 | 50 |
| | Carbon black 2 | high specific surface area | — | — | — | — | — | — |
| | Silica 1 | general-purpose | 30 | 30 | 30 | 30 | 30 | 30 |
| | Silica 2 | high specific surface area | — | — | — | — | — | — |
| | Silane coupling agent | | 2.5 | 2.5 | 2.5 | 2.5 | 2.5 | 2.5 |
| | Zinc oxide | | 2 | 2 | 2 | 2 | 2 | 2 |
| | Stearic acid | | 2 | 2 | 2 | 2 | 2 | 2 |
| | Antioxidant | | 2 | 2 | 2 | 2 | 2 | 2 |
| | Sulfur | | 1.5 | 1.5 | 1.5 | 1.5 | 1.5 | 1.5 |
| | Vulcanization accelerator 1 | | 1.5 | 1.5 | 1.5 | 1.5 | 1.5 | 1.5 |
| | Vulcanization accelerator 2 | | 1.5 | 1.5 | 1.5 | 1.5 | 1.5 | 1.5 |
| Evaluation | Heat build-up properties | tan δ at 30° C. (index) | 120 | 115 | 110 | 110 | 110 | 120 |
| | Chipping resistance | High tensile rate EB (%) | 610 | 600 | 550 | 540 | 560 | 625 |
| | | Low tensile rate EB (%) | 590 | 640 | 560 | 550 | 590 | 610 |
| | | On-vehicle evaluation (index) | 110 | 110 | 105 | 105 | 100 | 115 |

TABLE 2-continued

|  |  | Example | | | Comparative Example | | |
|---|---|---|---|---|---|---|---|
|  |  | Formulation number | | | | | |
|  |  | 7 | 8 | 9 | 10 | 11 | 12 |
| Formulation (parts by mass) | Highly purified natural rubber A | 60 | 60 | 60 | — | — | — |
|  | Highly purified natural rubber B | — | — | — | — | — | — |
|  | Highly purified natural rubber C | — | — | — | — | — | — |
|  | Highly purified natural rubber D | — | — | — | — | — | — |
|  | NR | — | — | — | 60 | 40 | 60 |
|  | SBR 1 general-purpose | 20 | 20 | — | 20 | 30 | 20 |
|  | SBR 2 general-purpose | — | — | — | — | — | — |
|  | SBR 3 high molecular weight | — | — | 20 | — | — | — |
|  | BR | 20 | 20 | 20 | 20 | 30 | 20 |
|  | Carbon black 1 general-purpose | — | 50 | — | 50 | 50 | 30 |
|  | Carbon black 2 high specific surface area | 50 | — | 50 | — | — | — |
|  | Silica 1 general-purpose | 30 | — | — | 30 | 30 | 50 |
|  | Silica 2 high specific surface area | — | 30 | 30 | — | — | — |
|  | Silane coupling agent | 2.5 | 2.5 | 2.5 | 2.5 | 2.5 | 2.5 |
|  | Zinc oxide | 2 | 2 | 2 | 2 | 2 | 2 |
|  | Stearic acid | 2 | 2 | 2 | 2 | 2 | 2 |
|  | Antioxidant | 2 | 2 | 2 | 2 | 2 | 2 |
|  | Sulfur | 1.5 | 1.5 | 1.5 | 1.5 | 1.5 | 1.5 |
|  | Vulcanization accelerator 1 | 1.5 | 1.5 | 1.5 | 1.5 | 1.5 | 1.5 |
|  | Vulcanization accelerator 2 | 1.5 | 1.5 | 1.5 | 1.5 | 1.5 | 1.5 |
| Evaluation | Heat build-up properties tan δ at 30° C. (index) | 125 | 130 | 135 | 100 | 90 | 95 |
|  | Chipping resistance High tensile rate EB (%) | 660 | 680 | 700 | 500 | 450 | 480 |
|  | Low tensile rate EB (%) | 600 | 640 | 610 | 560 | 540 | 510 |
|  | On-vehicle evaluation (index) | 125 | 125 | 135 | 100 | 90 | 95 |

As shown in Table 2, the examples with a high tensile rate EB of 540% or higher exhibited good chipping resistance and good fuel economy.

It is understood from FIGS. 1 and 2 that the $R^2$ for the high tensile rate EB is higher than that for the low tensile rate EB, and thus the high tensile rate EB strongly correlates with chipping resistance.

The invention claimed is:

1. A pneumatic tire, formed from a rubber composition, the rubber composition comprising:
   a rubber component comprising natural rubber, styrene-butadiene rubber and polybutadiene rubber;
   carbon black having a nitrogen adsorption specific surface area of 140 $m^2$/g to 190 $m^2$/g; and
   silica,
   wherein
   an amount of the natural rubber based on 100% by mass of the rubber component is 50 to 90% by mass,
   an amount of the styrene-butadiene rubber based on 100% by mass of the rubber component is 5 to 40% by mass,
   an amount of the polybutadiene rubber based on 100% by mass of the rubber component is 5 to 40% by mass,
   an amount of the carbon black per 100 parts by mass of the rubber component is 50 to 70 parts by mass,
   an amount of the silica per 100 parts by mass of the rubber component is 30 to 50 parts by mass, and
   the rubber composition has an elongation at break of 540% or higher as measured under the following test conditions:
   Tensile rate: 8.3 m/sec,
   Temperature: 75° C.,
   Specimen: No. 3 dumbbell.

2. The pneumatic tire according to claim 1, wherein the elongation at break is 600% or higher.

3. The pneumatic tire according to claim 1, wherein the elongation at break is 625% or higher.

4. The pneumatic tire according to claim 1, wherein the elongation at break is 660% or higher.

5. The pneumatic tire according to claim 1, wherein the elongation at break is 700% or higher.

6. The pneumatic tire according to claim 1, wherein the natural rubber is a modified natural rubber which has been highly purified and which has been adjusted to a pH of 2 to 7.

7. The pneumatic tire according to claim 1, wherein the styrene-butadiene rubber has a weight average molecular weight of 400,000 to 1,000,000.

8. The pneumatic tire according to claim 1, wherein the silica has a nitrogen adsorption specific surface area of 90 $m^2$/g to 220 $m^2$/g.

* * * * *